United States Patent
Harada et al.

(10) Patent No.: US 9,417,360 B2
(45) Date of Patent: Aug. 16, 2016

(54) STRETCHED OPTICAL COMPENSATION FILM

(71) Applicant: ADEKA CORPORATION, Tokyo (JP)

(72) Inventors: Masashi Harada, Saitama (JP); Yuki Tanaka, Saitama (JP); Takashi Murakami, Saitama (JP); Yuki Endo, Saitama (JP); Masaki Segawa, Saitama (JP)

(73) Assignee: ADEKA CORPORATION, Tokyo (JP)

( * ) Notice: Subject to any disclaimer, the term of this patent is extended or adjusted under 35 U.S.C. 154(b) by 0 days.

(21) Appl. No.: 14/358,068

(22) PCT Filed: Nov. 13, 2012

(86) PCT No.: PCT/JP2012/079424
§ 371 (c)(1),
(2) Date: May 14, 2014

(87) PCT Pub. No.: WO2013/073533
PCT Pub. Date: May 23, 2013

(65) Prior Publication Data
US 2014/0319436 A1 Oct. 30, 2014

(30) Foreign Application Priority Data
Nov. 15, 2011 (JP) ................. 2011-249520

(51) Int. Cl.
| | | |
|---|---|---|
| *F21V 9/00* | (2015.01) | |
| *G02B 5/02* | (2006.01) | |
| *G02C 7/10* | (2006.01) | |
| *G02F 1/361* | (2006.01) | |
| *G03B 11/00* | (2006.01) | |
| *G02B 1/04* | (2006.01) | |
| *C08K 5/07* | (2006.01) | |
| *G02B 5/30* | (2006.01) | |
| *C08J 5/18* | (2006.01) | |
| *C08L 1/10* | (2006.01) | |
| *C08L 1/12* | (2006.01) | |
| *G02B 5/32* | (2006.01) | |
| *G02F 1/1335* | (2006.01) | |
| *C09K 19/00* | (2006.01) | |

(52) U.S. Cl.
CPC . *G02B 1/045* (2013.01); *C08J 5/18* (2013.01); *C08K 5/07* (2013.01); *C08L 1/10* (2013.01); *C08L 1/12* (2013.01); *G02B 1/04* (2013.01); *G02B 5/3083* (2013.01); *G02B 5/32* (2013.01); *G02B 2207/113* (2013.01)

(58) Field of Classification Search
USPC ......... 156/230, 235, 238, 239, 240, 247, 297, 156/299; 252/582, 299.01; 349/96, 117, 349/118; 428/1.31, 1.33, 327, 510, 520, 428/522
See application file for complete search history.

(56) References Cited

U.S. PATENT DOCUMENTS

| | | | | |
|---|---|---|---|---|
| 7,166,339 | B1 * | 1/2007 | Mori et al. | 428/1.33 |
| 7,279,060 | B2 * | 10/2007 | Chen et al. | 156/230 |
| 7,622,185 | B2 * | 11/2009 | Wang et al. | 428/327 |
| 2003/0080326 | A1 | 5/2003 | Schunk et al. | |
| 2005/0249962 | A1 | 11/2005 | Chen et al. | |
| 2006/0234035 | A1 | 10/2006 | Wang et al. | |
| 2007/0243370 | A1 | 10/2007 | Wakizaka et al. | |

FOREIGN PATENT DOCUMENTS

| | | |
|---|---|---|
| JP | 9-169699 A | 6/1997 |
| JP | 2000-111914 A | 4/2000 |
| JP | 2003-177235 A | 6/2003 |
| JP | 2004-151472 A | 5/2004 |
| JP | 2007-298974 A | 11/2007 |
| JP | 2007-536569 A | 12/2007 |
| JP | 2008-537803 A | 9/2008 |
| JP | 2010-222433 A | 10/2010 |
| JP | 4605908 A | 1/2011 |

OTHER PUBLICATIONS

S. Hiranoa, T. Yogoa, W. Sakamotoa, Y. Takeichia, S. Onob, Processing of highly oriented LiNbO3 thin films through a metal-organic precursor solution, Journal of the European Ceramic Society 24 (2004) 435-440,2003 Elsevier Ltd. All rights reserved.*

Q.L. Liang, G.Y. Zhao a, J.G. Lu, Synthesis and fine patterning of organic-inorganic composite SiO2—Al2O3 thick films,Applied Surface Science 253 (2007) 5442-5446, 2007 Elsevier B.V. All rights reserved.*

International Search Report issued in PCT/JP2012/079424, mailed on Feb. 19, 2013.

* cited by examiner

*Primary Examiner* — Bijan Ahvazi
(74) *Attorney, Agent, or Firm* — Birch, Stewart, Kolasch & Birch, LLP

(57) ABSTRACT

Disclosed is a stretched optical compensation film which is a phase difference film containing a cellulose-based resin and having excellent optical properties. The stretched optical compensation film of the present invention contains 0.5 to 30 parts by mass of a β-diketone compound represented by Formula (I) with respect to 100 parts by mass of the cellulose-based resin. Positions $R_1$ and $R_2$ each independently represent an alkyl group having 1 to 20 carbon atoms which is optionally substituted, an arylalkyl group having 7 to 20 carbon atoms which is optionally substituted or an aryl group having 6 to 20 carbon atoms which is optionally substituted. Position $R_3$ represents a hydrogen atom or an alkyl group having 1 to 10 carbon atoms.

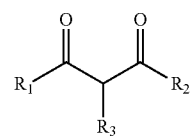

(I)

7 Claims, No Drawings

STRETCHED OPTICAL COMPENSATION FILM

TECHNICAL FIELD

The present invention relates to a stretched optical compensation film. More particularly, the present invention relates to a stretched optical compensation film in which, by incorporating a specific retardation-increasing agent into a cellulose-based resin, unprecedentedly large retardation is imparted and optical properties are improved.

BACKGROUND ART

Conventionally, resin films such as cellulose acylate films, polycarbonate films and polyolefin films have been used as optical compensation films for liquid crystal displays. Thereamong, cellulose acylate films have been widely used since they have excellent compatibility with polyvinyl alcohol used as a polarizer.

However, cellulose ester films themselves do not have sufficient retardation (birefringence) required for an optical compensation film; therefore, a variety of methods have been examined for imparting a cellulose ester film with retardation. In addition, in recent years, increasingly large retardation has been demanded due to further expansion of viewing angle and reduction in thickness of liquid crystal televisions.

For improvement of the retardation of a resin film, a method of adding a retardation-increasing agent is known; however, it has been difficult to apply such a method into practice since conventional retardation-increasing agents are required to be added in a large amount and cause problems of bleed-out and the like. In addition, for example, a method of reducing the total acyl group-substitution degree of cellulose has also been proposed; however, practical application of this method is also difficult since there are problems of an increase in the moisture absorption and the like.

Under such circumstances, as a step toward practical application, methods of adding a specific retardation-increasing agent have been recently proposed. For example, in Patent Document 1, a phase difference plate which comprises a cellulose ester film containing a specific aromatic compound as a retardation-increasing agent is proposed. Furthermore, in Patent Document 2, a cellulose ester film in which a polycyclic aromatic compound having a phenolic hydroxyl group is used as a retardation-increasing agent is proposed. Meanwhile, in Patent Document 3, an UV filter element in which dibenzoylmethane is used as an ultraviolet absorber, not as a retardation-increasing agent, is proposed.

RELATED ART DOCUMENTS

Patent Documents

Patent Document 1: Japanese Patent No. 4605908
Patent Document 2: Japanese Unexamined Patent Application Publication No. 2010-222433
Patent Document 3: Japanese Unexamined Patent Application Publication No. 2003-177235

SUMMARY OF THE INVENTION

Problems to be Solved by the Invention

However, the cellulose ester film of Patent Document 1, which comprises a retardation-increasing agent composed of a specific aromatic compound, does not have sufficient compatibility and, therefore, satisfactory optical property-improving effect is not attained. Furthermore, the cellulose ester film of Patent Document 2, in which a polycyclic aromatic compound having a phenolic hydroxyl group is used as a retardation-increasing agent, also does not have sufficient compatibility and, therefore, satisfactory optical property-improving effect is not attained.

Meanwhile, the UV filter element of Patent Document 3 is nothing more than a UV absorption-related technology and, in Patent Document 3, there is absolutely no description with regard to the optical property-improving effect exerted by the addition of dibenzoylmethane, let alone disclosure of application of the technology to a stretched optical compensation film.

In view of the above, an object of the present invention is to provide a stretched optical compensation film that is a phase difference film comprising a cellulose-based resin and having excellent optical properties.

Means for Solving the Problems

In order to solve the above-described problems, the present inventors intensively studied and discovered that the above-described object can be achieved by a film obtained by blending a β-diketone compound in a cellulose-based resin, thereby completing the present invention.

That is, the stretched optical compensation film of the present invention is characterized by comprising 0.5 to 30 parts by mass of a β-diketone compound represented by the following Formula (I) with respect to 100 parts by mass of a cellulose-based resin:

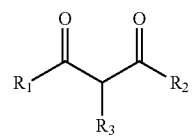

(I)

(wherein, $R_1$ and $R_2$ each independently represent an alkyl group having 1 to 20 carbon atoms which is optionally substituted, an arylalkyl group having 7 to 20 carbon atoms which is optionally substituted or an aryl group having 6 to 20 carbon atoms which is optionally substituted; and $R_3$ represents a hydrogen atom or an alkyl group having 1 to 10 carbon atoms).

In the present invention, the term "excellent optical properties" means that the film is imparted with large retardation, and this retardation can be generally understood in terms of the film in-plane retardation value (Ro) and the thickness-direction retardation value (Rth).

Here, the values of Ro and Rth are defined by the following equations, respectively.

$$Ro=(nx-ny) \times d$$

$$Rth=\{(nx+ny)/2-nz\} \times d$$

[wherein, nx represents the refractive index in the direction with the highest film in-plane refractive index; ny represents the film in-plane refractive index in the direction perpendicular to the direction of nx; nz represents the refractive index in the film thickness direction; and d represents the film thickness (μm)]

These retardation values, Ro and Rth, can be measured by, for example, using an automatic birefringence meter such as KOBRA-WR (manufactured by Oji Scientific Instruments) or RETS-100 (manufactured by Otsuka Electronics Co., Ltd.).

Effects of the Invention

The stretched optical compensation film of the present invention has excellent optical properties. That is, the stretched optical compensation film of the present invention is imparted with large retardation and can thus be suitably used as a phase difference film of liquid crystal displays, particularly VA-type liquid crystal displays in which a VA-mode liquid crystal cell is used.

MODE FOR CARRYING OUT THE INVENTION

The stretched optical film of the present invention will now be described in detail.

The cellulose-based resin used in the present invention may be of any kind; however, it is preferably a lower fatty acid ester of cellulose. The term "lower fatty acid" in the lower fatty acid ester of cellulose means a fatty acid having not more than 6 carbon atoms and examples of such lower fatty acid ester of cellulose include cellulose acetate, cellulose propionate and cellulose butyrate, as well as mixed fatty acid esters such as cellulose acetate propionate and cellulose acetate butyrate that are described in, for example, Japanese Unexamined Patent Application Publication Nos. H10-45804 and H8-231761 and U.S. Pat. No. 2,319,052.

In the β-diketone compound used in the present invention, examples of the alkyl group having 1 to 20 carbon atoms which is optionally substituted and represented by $R_1$ and $R_2$ in the above-described Formula (I) include methyl, ethyl, propyl, isopropyl, butyl, isobutyl, sec-butyl, tert-butyl, amyl, isoamyl, hexyl, isohexyl, heptyl, octyl, isooctyl, tert-octyl, 2-ethylhexyl, nonyl, isononyl, decyl, undecyl, dodecyl, tridecyl, tetradecyl, pentadecyl, hexadecyl, heptadecyl, octadecyl, nonadecyl and icosyl. Further, examples of the arylalkyl group having 7 to 20 carbon atoms which is optionally substituted and represented by $R_1$ and $R_2$ include benzyl, phenethyl, 2-phenylpropane-2-yl, styryl, cinnamyl, diphenylmethyl and triphenylmethyl. Moreover, examples of the aryl group which is optionally substituted and represented by $R_1$ and $R_2$ include phenyl, naphthyl, phenanthryl and anthracenyl. Examples of substituent include alkyl groups having 1 to 10 carbon atoms, such as methyl, ethyl, propyl, isopropyl, butyl, isobutyl, sec-butyl, tert-butyl, amyl, isoamyl, hexyl, isohexyl, heptyl, octyl, isooctyl, tert-octyl, 2-ethylhexyl, nonyl, isononyl and decyl; alkoxy groups having 1 to 10 carbon atoms, such as methoxy, ethoxy, propoxy, isopropoxy, butoxy and isobutoxy; alkanoyloxy groups having 1 to 10 carbon atoms, such as methanoyloxy, ethanoyloxy and propanoyloxy; alkoxycarbonyl groups having 1 to 10 carbon atoms, such as methoxycarbonyl, ethoxycarbonyl and propoxycarbonyl; alkoxyalkyleneoxy groups having 2 to 20 carbon atoms, such as methoxymethyleneoxy, ethoxymethyleneoxy and methoxyethyleneoxy; alkoxycarbonylalkyleneoxy groups having 3 to 21 carbon atoms, such as methoxycarbonylmethyleneoxy, ethoxycarbonylmethyleneoxy and methoxycarbonylethyleneoxy; halogen atoms such as chlorine and bromine; hydroxy group; and a —$NR_4R_5$ group (wherein, $R_4$ and $R_5$ each independently represent a hydrogen atom, an alkyl group having 1 to 10 carbon atoms or an acyl group having 1 to 10 carbon atoms). Here, the above-described alkoxyalkyleneoxy groups are specifically represented by the following formula:

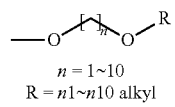

$n = 1 \sim 10$
$R = n1 \sim n10$ alkyl and the above-described alkoxycarbonylalkyleneoxy groups are specifically represented by the following formula:

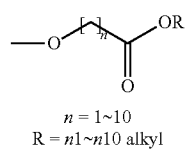

$n = 1 \sim 10$
$R = n1 \sim n10$ alkyl

Examples of the alkyl group having 1 to 10 carbon atoms which is represented by $R_3$ in the above-described Formula (I) include methyl, ethyl, propyl, isopropyl, butyl, isobutyl, sec-butyl, tert-butyl, amyl, isoamyl, hexyl, isohexyl, heptyl, octyl, isooctyl, tert-octyl, 2-ethylhexyl, nonyl, isononyl and decyl.

Among these β-diketone compounds, compounds in which at least either one of $R_1$ and $R_2$ in the above-described Formula (I) is an aryl group that is optionally substituted, particularly those compounds represented by the following Formula (I-1) are preferred because they have excellent compatibility with cellulose acylate and are capable of imparting good retardation:

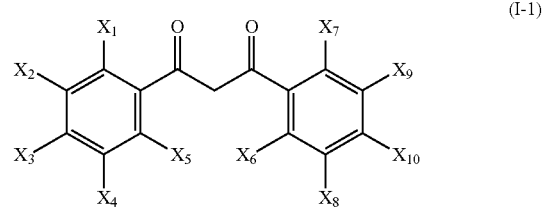

(wherein, $X_1$ to $X_{10}$ each independently represent a hydrogen atom, a hydroxy group, a halogen atom, an alkyl group having 1 to 10 carbon atoms, an alkoxy group having 1 to 10 carbon atoms, an alkanoyloxy group having 1 to 10 carbon atoms, an alkoxycarbonyl group having 1 to 10 carbon atoms, an alkoxyalkyleneoxy group having 2 to 20 carbon atoms, an alkoxycarbonylalkyleneoxy group having 3 to 21 carbon atoms, a phenyl group or a —$NR_4R_5$ group (wherein, $R_4$ and $R_5$ each independently represent a hydrogen atom, an alkyl group having 1 to 10 carbon atoms or an acyl group having 1 to 10 carbon atoms); and at least one pair of $X_1$ and $X_2$, $X_2$ and $X_3$, $X_4$ and $X_5$, $X_6$ and $X_7$, $X_7$ and $X_8$, $X_8$ and $X_9$, and $X_9$ and $X_{10}$ optionally form a benzene ring together).

In the above-described Formula (I-1), examples of the alkyl group having 1 to 10 carbon atoms which is represented by $X_1$ to $X_{10}$ include methyl, ethyl, propyl, isopropyl, butyl, isobutyl, sec-butyl, tert-butyl, amyl, isoamyl, hexyl, isohexyl, heptyl, octyl, isooctyl, tert-octyl, 2-ethylhexyl, nonyl, isononyl and decyl, and examples of the alkoxy group having 1 to 10 carbon atoms include methoxy, ethoxy, propoxy, isopropoxy, butoxy and isobutoxy. Further, examples of the alkanoyloxy group having 1 to 10 carbon atoms includ e methanoyloxy, ethanoyloxy and propanoyloxy, and examples of the alkoxycarbonyl group having 1 to 10 carbon atoms include methoxycarbonyl, ethoxycarbonyl and propoxycarbonyl. Still further, examples of the alkoxyalkyleneoxy group having 2 to 20 carbon atoms include methoxymethyleneoxy, ethoxymethyleneoxy and methoxyethyleneoxy, and examples of the alkoxycarbonylalkyleneoxy group having 3 to 21 carbon atoms include methoxycarbonylmethyleneoxy, ethoxycarbonylmethyleneoxy and methoxycarbonylethyleneoxy.

Examples of the alkyl group having 1 to 10 carbon atoms which may be represented by the above-described $R_4$ and $R_5$ include the same ones as those described above. Further, examples of the acyl group having 1 to 10 carbon atoms which may be represented by the above-described $R_4$ and $R_5$ include methanoyl (formyl), ethanoyl(acetyl), propanoyl, butanoyl, pentanoyl, hexanoyl, octanoyl and nonanoyl groups.

Examples of the β-diketone compound used in the present invention are shown below; however, the present invention is not restricted thereto.

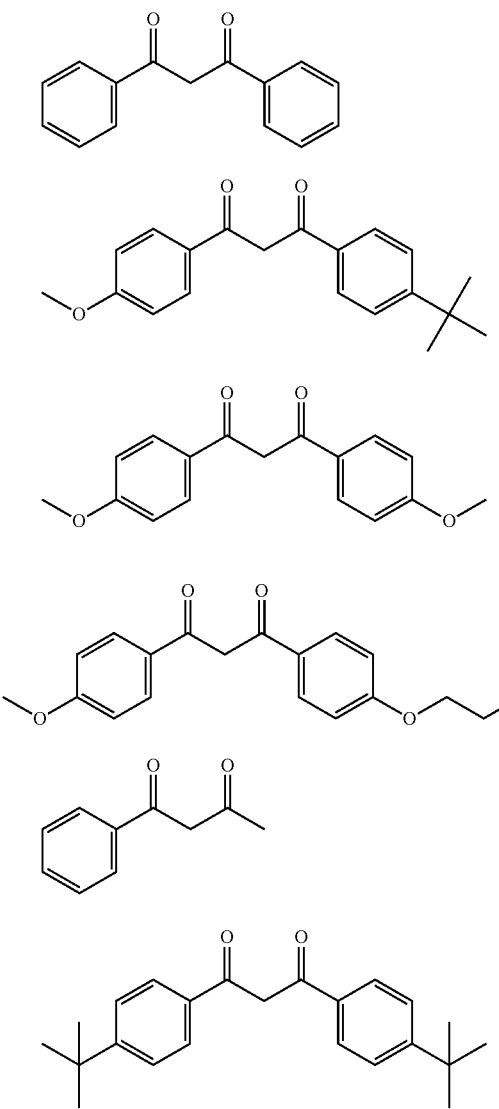

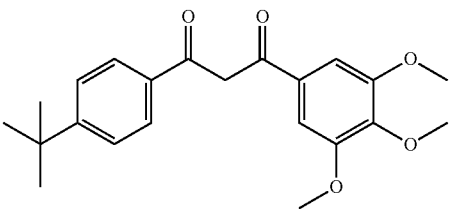

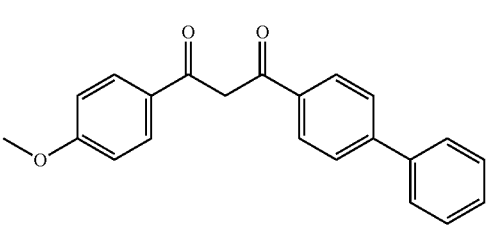

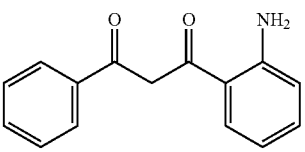

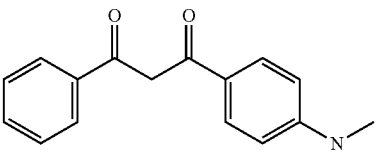

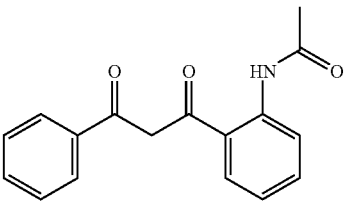

These β-diketone compounds are used in an amount of 0.5 to 30 parts by mass, preferably 1 to 20 parts by mass, with respect to 100 parts by mass of a cellulose-based resin. When the amount of a β-diketone compound is less than 0.5 parts by mass, its effect cannot be sufficiently exhibited, while when the amount exceeds 30 parts by mass, bleeding occurs and the physical properties of the resulting stretched optical compensation film are deteriorated; therefore, such amount of a β-diketone compound is not preferred.

In the stretched optical compensation film of the present invention, a plasticizer can be arbitrarily used. Examples of the plasticizer include phthalate-based plasticizers such as dibutyl phthalate, butylhexyl phthalate, diheptyl phthalate, dioctyl phthalate, diisononyl phthalate, diisodecyl phthalate, dilauryl phthalate, dicyclohexyl phthalate and dioctyl terephthalate; adipate-based plasticizers such as dioctyl adipate, diisononyl adipate, diisodecyl adipate and di(butyldiglycol) adipate; phosphate-based plasticizers such as triphenyl phosphate, tricresyl phosphate, trixylenyl phosphate, tri(isopropylphenyl)phosphate, triethyl phosphate, tributyl phosphate, trioctyl phosphate, tri(butoxyethyl)phosphate and octyldiphenyl phosphate; polyester-based plasticizers in which ethylene glycol, diethylene glycol, triethylene glycol, 1,2-propylene glycol, 1,3-propylene glycol, 1,3-butane diol, 1,4- butane diol, 1,5-hexane diol, 1,6-hexane diol, neopentyl glycol or the like is used as a polyhydric alcohol, oxalic acid, malonic acid, succinic acid, glutaric acid, adipic acid, pimelic acid, suberic acid, azelaic acid, sebacic acid, phthalic acid, isophthalic acid, terephthalic acid or the like is used as a dibasic acid and, as required, a monohydric alcohol or a monocarboxylic acid (such as acetic acid or aromatic acid) is used as a stopper; tetrahydrophthalic acid-based plasticizers; azelaic acid-based plasticizers; sebacic acid-based plasticizers; stearic acid-based plasticizers; citric acid-based plasticizers; trimellitic acid-based plasticizers; pyromellitic acid-based plasticizers; biphenylene polycarboxylic acid-based plasticizers; and polyhydric alcohol aromatic acid ester-based plasticizers (such as trimethylolpropane tribenzoate).

Further, in the stretched optical compensation film of the present invention, a variety of other additives, such as a phosphorus-based, phenol-based or sulfur-based antioxidant, an ultraviolet absorber and a hindered amine-based light stabilizer, may also be incorporated.

Examples of the above-described phosphorus-based antioxidant include triphenyl phosphite, tris(2,4-di-tert-butylphenyl)phosphite, tris(nonylphenyl)phosphite, tris(dinonylphenyl)phosphite, tris(mono-, di-mixed nonylphenyl) phosphite, bis(2-tert-butyl-4,6-dimethylphenyl)•ethyl phosphite, diphenyl acid phosphite, 2,2'-methylene-bis(4,6-di-tert-butylphenyl)octyl phosphite, diphenyldecyl phosphite, phenyldiisodecyl phosphite, tributyl phosphite, tris(2-ethylhexyl)phosphite, tridecyl phosphite, trilauryl phosphite, dibutyl acid phosphite, dilauryl acid phosphite, trilauryl trithiophosphite, bis(neopentyl glycol)•1,4-cyclohexane dimethyl diphosphite, bis(2,4-di-tert-butylphenyl)pentaerythritol diphosphite, bis(2,6-di-tert-butyl-4-methylphenyl)pentaerythritol diphosphite, distearylpentaerythritol diphosphite, phenyl-4,4'-isopropylidene diphenol•pentaerythritol diphosphite, tetra(C12-15 mixed alkyl)-4,4'-isopropylidene diphenyl phosphite, bis[2,2'-methylene-bis(4,6-diamylphenyl)]•isopropylidene diphenyl phosphite, hydrogenated-4,4'-isopropylidene diphenol polyphosphite, bis(octylphenyl)•bis[4,4'-n-butylidene-bis(2-tert-butyl-5-methylphenol)]•1,6-hexane diol•diphosphite, tetratridecyl•4,4'-butylidene-bis(2-tert-butyl-5-methylphenol) diphosphite, hexa(tridecyl)•1,1,3-tris(2-methyl-5-tert-butyl-4-hydroxyphenyl)butane•triphosphonite, 9,10-dihydro-9-oxa-10-phosphaphenanthrene-10-oxide and 2-butyl-2-ethylpropane diol•2,4,6-tri-tert-butylphenol monophosphite.

Examples of the above-described phenol-based antioxidant include 2,6-di-tert-butyl-p-cresol, 2,6-diphenyl-4-octadesiloxyphenol, stearyl(3,5-di-tert-butyl-4-hydroxyphenyl) propionate, distearyl(3,5-di-tert-butyl-4-hydroxybenzyl) phosphonate, tridecyl•3,5-di-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(4,6-di-tert-butylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl] terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl] isocyanurate, tetrakis[methylene-3-(3,5-di-tert-butyl-4-hydroxyphenyl)propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane] and triethylene glycol-bis[β-(3-tert-butyl-4-hydroxy-5-methylphenyl)propionate].

Examples of the above-described sulfur-based antioxidant include dialkyl thiodipropionates such as dilauryl thiodipropionate, dimyristyl thiodipropionate, myristylstearyl thiodipropionate and distearyl thiodipropionate; and β-alkylmercaptopropionates of polyols, such as pentaerythritol tetra(β-dodecylmercaptopropionate).

Examples of the above-described ultraviolet absorber include 2-hydroxy benzophenones such as 2,4-dihydroxybenzophenone, 2-hydroxy-4-methoxybenzophenone, 2-hydroxy-4-octoxybenzophenone, 2-hydroxy-4-tert-butyl-4'-(2-methacryloyloxyethoxyethoxy)benzophenone and 5,5'-methylene-bis(2-hydroxy-4-methoxybenzophenone); 2-(2-hydroxyphenyl)benzotriazoles such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3-dodecyl-5-methylphenyl)benzotriazole, 2-(2-hydroxy-3-tert-butyl-5-C7 to C9 mixed-alkoxycarbonylethylphenyl)triazole, 2-(2-hydroxy-3,5-dicumylphenyl)benzotriazole, 2,2'-methylene-bis(4-tert-octyl-6-benzotriazolylphenol) and polyethylene glycol ester of 2-(2-hydroxy-3-tert-butyl-5-carboxyphenyl)benzotriazole; 2-(2-hydroxyphenyl)-1,3,5-triazines such as 2-(2-hydroxy-4-hexyloxyphenyl)-4,6-diphenyl-1,3,5-triazine, 2-(2-hydroxy-4-methoxyphenyl)-4,6-diphenyl-1,3,5-triazine, 2-(2-hydroxy-4-octoxyphenyl)-4,6-bis(2,4-dimethylphenyl)-1,3,5-triazine and 2-(2-hydroxy-4-acryloyloxyethoxyphenyl)-4,6-bis(2,4-dimethylphenyl)-1,3,5-triazine; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenylacrylate and methyl-2-cyano-3-methyl-3-(p-methoxyphenyl)acrylate.

Examples of the above-described hindered amine-based light stabilizer include 2,2,6,6-tetramethyl-4-piperidyl stearate, 1,2,2,6,6-pentamethyl-4-piperidyl stearate, 2,2,6,6-tetramethyl-4-piperidylbenzoate, bis(2,2,6,6-tetramethyl-4-piperidyl)sebacate, bis(1,2,2,6,6-pentamethyl-4-piperidyl) sebacate, bis(1-octoxy-2,2,6,6-tetramethyl-4-piperidyl) sebacate, tetrakis(2,2,6,6-tetramethyl-4-piperidyl)-1,2,3,4-butane tetracarboxylate, tetrakis(1,2,2,6,6-pentamethyl-4-piperidyl)-1,2,3,4-butane tetracarboxylate, bis(2,2,6,6-tetramethyl-4-piperidyl)•bis(tridecyl)-1,2,3,4-butane tetracarboxylate, bis(1,2,2,6,6-pentamethyl-4-piperidyl)•bis (tridecyl)-1,2,3,4-butane tetracarboxylate, bis(1,2,2,6,6-pentamethyl-4-piperidyl)-2-butyl-2-(3,5-di tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6, 6-tetramethyl-4-piperidyl)amino-s-triazine-6-ylamino] undecane, 1,6,11-tris[2,4-bis(N-butyl-N-(1,2,2,6,6-pentamethyl-4-piperidyl)amino-s-triazine-6-ylamino] undecane, 3,9-bis[1,1-dimethyl-2-{tris(2,2,6,6-tetramethyl-4-piperidyloxycarbonyloxy)butylcarbonyloxy}ethyl]-2,4,8,10-tetraoxaspiro[5.5]undecane and 3,9-bis[1,1-dimethyl-2-{tris(1,2,2,6,6-pentamethyl-4-piperidyloxycarbonyloxy)butylcarbonyloxy}ethyl]-2,4,8,10-tetraoxaspiro[5.5] undecane.

In addition to the above, in the stretched optical compensation film of the present invention, as required, other additives such as a filler, a coloring agent, a cross-linking agent, an antistatic agent, a plate-out inhibitor, a surface treatment agent, a lubricant, a flame retardant, a fluorescent agent, an antifungal agent, an antibacterial agent, a metal inactivator, a mold-releasing agent, a pigment, a processing aid, an antioxidant, a light stabilizer and a foaming agent may also be incorporated.

A method of producing the stretched optical compensation film of the present invention will now be described; however the present invention is not restricted thereto.

The stretched optical compensation film of the present invention is produced by applying and drying a dope solution in which a cellulose ester is dissolved in a solvent. A variety of additives can be also added to the dope solution as required. In the dope solution, a higher concentration of the cellulose ester is more preferred because the drying load after flow-casting the dope solution onto a substrate can be reduced; however, when the concentration of the cellulose ester is excessively high, the filtering load is increased, which results in poor filtration accuracy. In order to attain reduction in both the drying load and filtering load, the concentration of the cellulose ester is preferably 10 to 30% by mass, more preferably 15 to 25% by mass.

The solvent used for preparing the dope solution of the present invention may be used individually or in combination with other solvent; however, from the standpoint of the production efficiency, it is preferred to use a mixture of a good solvent and poor solvent of cellulose ester. The mixing ratio of the good solvent and poor solvent is preferably in the range of 70 to 98% by mass of the good solvent and 30 to 2% by mass of the poor solvent. With regard to the good solvent and poor solvent that are used in the present invention, a solvent which independently dissolves the cellulose ester used is defined as "good solvent" and a solvent which, by itself, only swells the cellulose ester or cannot dissolve the cellulose ester is defined as "poor solvent". Therefore, the good and poor solvents are variable depending on the average acetylation degree of cellulose. For example, acetone is a good solvent for a cellulose ester having an average acetylation degree of 55%; however, it is a poor solvent for a cellulose ester having an average acetylation degree of 60%. In this manner, the good and poor solvents are not unambiguously determined in all cases. In the case of cellulose triacetate which is a preferred cellulose ester in the present invention, the good solvent are, for example, organic halogen compounds such as methylene chloride and dioxolanes and, in the case of cellulose acetate propionate, the good solvents are, for example, methylene chloride, acetone and methyl acetate. Meanwhile, examples of the poor solvent in these cases include methanol, ethanol, n-butanol, cyclohexane and cyclohexanone.

As a method of dissolving a cellulose ester in the preparation of the above-described dope solution, any conventional method can be employed; however, it is preferred to employ a method in which a cellulose ester is dissolved with stirring under pressure by heating in a temperature range which is not lower than the boiling point of the solvent under normal pressure and where the solvent does not boil, because such a method can inhibit generation of an aggregated undissolved matter called "gel" or "lump". Alternatively, a method in which a cellulose ester is mixed with a poor solvent to wet or swell the cellulose ester and then dissolved by further mixing with a good solvent may also be preferably employed. Further, a known cooling dissolution method may be employed as well. In cases where a cooling dissolution method is employed, methyl acetate or acetone can be used as the good solvent. Pressurization can be performed by a method of injecting an inert gas such as nitrogen gas or by increasing the vapor pressure of the solvent by heating. The heating is preferably performed externally and, for example, a jacket-type heater is preferably employed because the temperature can be easily controlled.

From the standpoint of the solubility of cellulose esters, heating after the addition of solvent is preferably performed in a temperature range which is not lower than the boiling point of the used solvent under normal pressure and where the solvent does not boil. When the heating temperature is excessively high, the required pressure is increased, which leads to a reduction in the productivity. The heating temperature is preferably in the range of 45 to 120° C., more preferably 60 to 110° C., still more preferably 70 to 105° C. Further, the pressure is adjusted such that the solvent does not boil at the preset temperature. After the heating, the resulting cellulose ester solution is filtered through an appropriate filter medium such as a filter paper. As the filter medium, a filter having a small absolute filtration accuracy is preferred for removal of undesired matters and the like; however, an excessively small absolute filtration accuracy leads to a problem that clogging of the filter medium is likely to occur. Accordingly, the absolute filtration accuracy of the filter medium is preferably 0.008 mm or less, more preferably in the range of 0.001 to 0.008 mm, still more preferably in the range of 0.003 to 0.006 mm. The material of the filter medium is not particularly restricted and any conventional filter medium can be used; however, filter media made of a plastic such as polypropylene or Teflon (registered trademark) and those made of a metal such as stainless metal are preferred because these filter media are free of problems such as fiber fall-off.

The filtration of the dope solution can be performed by a conventional method; however, it is preferred to employ a method in which the dope solution is filtered under pressure with heating in a temperature range which is not lower than the boiling point of the solvent under normal pressure and where the solvent does not boil, because such a method causes only a small increase in the difference between the pressures on each side of the filter medium (hereinafter, may be referred to as "filtration pressure"). The filtration temperature is preferably 45 to 120° C., more preferably 45 to 70° C., still more preferably 45 to 55° C. The smaller the filtration pressure, the more preferred it is. The filtration pressure is preferably $1.6 \times 10^6$ Pa or less, more preferably $1.2 \times 10^6$ Pa or less, still more preferably $1.0 \times 10^6$ Pa or less.

As the substrate used in the flow-casting (casting) step, an endless belt-form or drum-form mirror-finished stainless-steel substrate is preferred. The temperature of the substrate in the casting step is preferably 0° C. to lower than the boiling point of the solvent. The higher the temperature, a higher temperature leads to a faster drying rate; however, an excessively high temperature may cause foaming and deterioration in the planarity of the resulting film. The substrate temperature is preferably 0 to 50° C., more preferably 5 to 30° C. The method of controlling the substrate temperature is not particularly restricted, and examples thereof include a method in which warm air or cool air is blown against the substrate and a method in which a warm-water vat is brought into contact with the substrate. Among these methods, a method of using a warm-water vat is preferred because heat is efficiently transferred and the time required for bringing the substrate to a constant temperature is shortened. When warm air is used, it is required that the temperature thereof be higher than the intended temperature of the substrate. In order to obtain a cellulose ester film having good planarity, the amount of residual solvent at the time of removing the film from the substrate is preferably 10 to 120% by mass, more preferably 20 to 40% by mass or 60 to 120% by mass, particularly preferably 20 to 30% by mass or 70 to 115% by mass.

In the present invention, the amount of residual solvent is defined by the following equation:

Amount of residual solvent=[(Film mass before heat treatment−Film mass after heat treatment)/(Film mass after heat treatment)]×100(%)

Here, the "heat treatment" performed at the time of measuring the amount of residual solvent refers to 1-hour heating of the film at 115° C. Further, in the step of drying the resulting cellulose ester film, the film detached from the substrate is further dried such that the amount of the residual solvent becomes preferably 3% by mass or less, more preferably 0.5% by mass or less. In the film drying step, generally, a method in which the film is dried while being transferred by a roll suspension method or tenter method can be employed.

It is preferred that maintenance of the film width or stretching of the film be performed by a tenter method while a large amount of solvent still remains immediately after the film is detached from the substrate, because this allows superior dimensional stability-improving effect to be exhibited. The means for drying the film is not particularly restricted and the film can be dried using, for example, hot air, infrared radiation, heated roll or microwave. From the standpoint of simplicity, the film is preferably dried using hot air. In this case, it is preferred that the drying temperature be stepwise increased in the range of 40 to 150° C. and, in order to improve the dimensional stability, it is more preferred that the film be dried at a temperature of 50 to 140° C.

With regard to the thickness of the stretched optical compensation film, the thinner the film, the more preferred it is, because reduction in the thickness of a liquid crystal display can be more easily achieved; however, an excessively thin stretched optical compensation film causes an increase in the moisture permeability, which leads to insufficient tearing strength and the like. In order to attain low moisture permeability as well as sufficient tearing strength and the like, the thickness of the cellulose ester film is preferably 10 to 150 µM, more preferably 20 to 100 µm.

EXAMPLES

The stretched optical compensation film of the present invention will now be described in more detail by way of examples thereof; however, the present invention is not restricted thereto.

Examples 1 to 9 and Comparative Example

In a mixed solvent composed of 400 parts by mass of methylene chloride and 100 parts by mass of methyl alcohol, 100 parts by mass of cellulose triacetate (acetylation degree: 61.5%, polymerization degree: 260) and the respective additives shown in Table 1 below in the amount (parts by mass) shown in the same Table 1 were uniformly dissolved with stirring to prepare various dope solutions. Then, the thus obtained dope solutions were each flow-casted on a glass plate to a thickness of about 0.1 mm and dried at room temperature for 16 hours, followed by 1-hour drying at 50° C. and 1-hour drying at 120° C. Thereafter, the resultants were each uniaxially stretched at 150° C. using a stretching apparatus EX10-B1 (manufactured by Toyo Seiki Seisaku-sho, Ltd.), thereby obtaining various evaluation films. All of the thus obtained films had a thickness of about 80 µm and were stretched at a draw ratio of 1.3 times.

(Method of Evaluating Bleed Resistance)

The thus obtained films were each cut into a size of 30 mm×40 mm and left to stand for 120 hours in an incubator at a temperature of 85° C. and a relative humidity of 90%. Then, the surface of each film was visually observed and the presence or absence of bleeding was verified based on the following evaluation criteria.

○: No bleeding was observed.
x: Bleeding was observed.

(Method of Measuring Retardation)

For the thus obtained films, using an automatic birefringence meter RETS-100 (manufactured by Otsuka Electronics Co., Ltd.), the in-plane retardation (Ro) and thickness-direction retardation (Rth) at a wavelength of 590 nm were determined under an environment of 25° C. and 60% RH in accordance with the following equations.

$$Ro = (nx-ny) \times d$$

$$Rth = \{(nx+ny)/2 - nz\} \times d$$

[wherein, nx represents the refractive index in the direction with the highest film in-plane refractive index; ny represents the film in-plane refractive index in the direction perpendicular to the direction of nx; nz represents the refractive index in the film thickness direction; and d represents the film thickness (µm)]

The thus obtained evaluation results are shown in Table 1 below.

TABLE 1

| | Additive | Added amount (parts by mass) | Bleed resistance | Retardation Ro (nm) | Rth (nm) |
|---|---|---|---|---|---|
| Example 1 | BD-1 | 10 | ○ | 69 | 245 |
| Example 2 | BD-1 | 5 | ○ | 26 | 156 |
| Example 3 | BD-2 | 10 | ○ | 62 | 218 |
| Example 4 | BD-2 | 5 | ○ | 31 | 168 |
| Example 5 | BD-3 | 5 | ○ | 50 | 260 |
| Example 6 | BD-4 TPP* | 5 5 | ○ | 26 | 190 |
| Example 7 | BD-4 TPP | 1 9 | ○ | 10 | 78 |
| Example 8 | BD-5 | 5 | ○ | 16 | 91 |
| Example 9 | BD-9 | 5 | ○ | 26 | 120 |
| Comparative Example | TPP* | 10 | ○ | 1 | 34 |

*triphenyl phosphate

As clearly seen from Table 1, in all of Examples where the β-diketone compound according to the present invention was used, excellent compatibility was attained. In addition, it is seen that, as compared to the film of Comparative Example in which a general-purpose modifier, triphenyl phosphate, was used, the films of Examples showed superior optical properties with larger retardation values (Ro and Rth). Furthermore, from the results of Examples 6 and 7, it is seen that comparable improving effect can be attained even when the β-diketone compound according to the present invention and triphenyl phosphate are mixed.

The invention claimed is:

1. A stretched optical compensation film comprising 0.5 to 30 parts by mass of a β-diketone compound represented by the following Formula (I) with respect to 100 parts by mass of a cellulose-based resin:

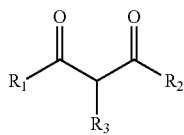
(I)

wherein, $R_1$ and $R_2$ each independently represent an alkyl group having 1 to 20 carbon atoms which is optionally substituted, an arylalkyl group having 7 to 20 carbon atoms which is optionally substituted or an aryl group having 6 to 20 carbon atoms which is optionally substituted;

$R_3$ represents a hydrogen atom or an alkyl group having 1 to 10 carbon atoms; and at least one of $R_1$ and $R_2$ represents an alkyl group.

2. The stretched optical compensation film according to claim 1, wherein said β-diketone compound is a compound in which, in said Formula (I), one of $R_1$ and $R_2$ is an aryl group that is optionally substituted.

3. The stretched optical compensation film according to claim 2, wherein said cellulose-based resin is cellulose acylate.

4. The stretched optical compensation film according to claim 2, wherein said β-diketone compound is a compound in which, in said Formula (I), the $R_1$ or $R_2$ that is not the aryl group is a methyl group.

5. The stretched optical compensation film according to claim 1, wherein said cellulose-based resin is cellulose acylate.

6. The stretched optical compensation film according to claim 1, wherein the β-diketone compound is

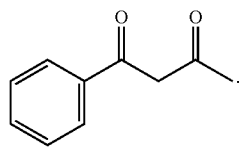
BD-5

7. The stretched optical compensation film according to claim 6, wherein said cellulose-based resin is cellulose acylate.

* * * * *